United States Patent Office 3,004,935
Patented Oct. 17, 1961

3,004,935
SELF-EXTINGUISHING ALKENYL POLYMER COMPOSITIONS CONTAINING POLYBROMO CYCLOHEXANES
Charles F. Raley, Jr., and William R. Nummy, Midland, Mich., assignors to The Dow Chemical Company, Midland, Mich., a corporation of Delaware
No Drawing. Filed July 24, 1958, Ser. No. 750,557
7 Claims. (Cl. 260—2.5)

This invention concerns fire and flame retardant plastic compositions of flammable alkenyl aromatic resins having a small proportion of one or more of a limited group of polybromocyclohexanes incorporated therewith.

By an "alkenyl aromatic resin" is meant a solid polymer of one or more polymerizable alkenyl aromatic compounds. Such polymer comprises in chemically combined form at least 50 percent by weight of at least one alkenyl aromatic compound having the general formula:

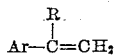

wherein Ar represents an aromatic hydrocarbon radical, or an aromatic halohydrocarbon radical, of the benzene series, and R is hydrogen or the methyl radical. Examples of such alkenyl aromatic resins are the solid homopolymers of styrene, alpha-methyl styrene, vinyltoluene, ar-ethylstyrene, vinylxylene, ar-chlorostyrene, ar-isopropylstyrene or ar-tert.-butylstyrene; the solid copolymers of two or more of such alkenyl aromatic compounds with one another; and solid copolymers of one or more of such alkenyl aromatic compounds with minor amounts of other readily polymerizable olefinic compounds such as methyl methacrylate or acrylonitrile.

The expressions "non-flammable," "flame-proof" and "self-extinguishing," as employed herein, mean incapable of sustaining a flame until completely burned after a composition has been ignited in an open flame and then removed from the flame.

It is known that the halogen content of halogenated organic compounds often has an effect of reducing the flammability both of the compound containing the halogen and of flammable organic materials intimately admixed therewith. There are numerous instances in which the flammability of organic materials such as wood, paper, cellulose derivatives and alkenyl aromatic resins, etc., has been reduced by admixing organic halogen-containing compounds therewith. It is also known that bromine-containing compounds possess, in most instances, a greater flame-retarding action than do corresponding chlorine-containing compounds. However, the organic bromides differ widely among themselves in effectiveness as flame-retarding agents. Also, many organic bromides are excessively unstable to light or heat and cause pronounced discoloration and degradation of plastic compositions comprising the same on standing, or during molding of the compositions.

It has now been discovered that polybromocyclohexanes such as tribromotrichlorocyclohexane, tetrabromodichlorocyclohexane, pentabromomonochlorocyclohexane, hexabromocyclohexane (benzene hexabromide) or mixtures thereof are effective in flame-proofing alkenyl aromatic resins when admixed therewith in minor amount, e.g. in amounts of from 0.5 to 4.5 precent by weight of the alkenyl aromatic resin. It has further been found that the alkenyl aromatic resin compositions comprising these polybromocyclohexanes undergo only slight, or no discoloration during molding or extrusion at usual molding and extrusion temperatures, or on standing under exposure to light.

The bromochlorocyclohexane compounds to be employed as the self-extinguishing agents in the compositions can be prepared by reaction of chlorine and bromine with benzene in proportions corresponding to a ratio of from 1:5 to 3:3 gram chemical equivalents of the chlorine to bromine per gram molecular proportion of the benzene. The reaction can be carried out at temperatures between about 5° and 80° C., suitably in an inert organic liquid such as methylene chloride or carbon tetrachloride as reaction medium, and under the influence of actinic radiation, e.g. ultraviolet light or sunlight, employing procedure similar to that described in Bull. Soc. Chim. (France), pages 118–121 (1949).

The product precipitates or can be recovered from the reaction mixture as a crystalline solid. It can be purified by recrystallization from a suitable solvent. The pentabromomonochlorocyclohexane product is usually obtained as a crystalline solid melting at temperatures between 200° and 203° C. containing from 76 to 76.5 percent by weight of bromine and corresponding to the compound pentabromomonochlorocyclohexane having the empirical formula $C_6H_5ClBr_5$. The tribromotrichlorocyclohexane product has been prepared as a white crystalline solid melting at temperatures between 137° and 160° C. and containing bromine and chlorine in amount as determined by analysis corresponding to the compound having the empirical formula $C_6H_6Cl_3Br_3$. Mixtures of the compounds tribromotrichlorocyclohexane, tetrabromodichlorocyclohexane and pentabromomonochlorocyclohexane can be obtained by varying the reaction conditions and the ratio of chlorine and bromine to benzene employed in the reaction. For purpose of the invention such mixture of the polybromochlorocyclohexanes need not be separated into its constituents, since mixtures of the polybromocyclohexanes are operable in the process.

The polybromocyclohexanes can be used as self-extinguishing agents when either solid or cellular articles are prepared from the alkenyl aromatic resins, i.e. the compounds can be used in compositions which are employed for making plastic articles by usual compression or injection molding operations or by extrusion methods, or when making foamed cellular articles wherein a normally gaseous agent or a volatile organic liquid, e.g. methyl chloride or isopentane, is incorporated with the heat-plastified alkenyl aromatic resin under pressure, then is extruded into a zone of lower pressure wherein the extruded material expands with resultant formation of a cellular article. A method of making cellular articles is disclosed in U.S. Patent No. 2,669,751 wherein a thermoplastic alkenyl aromatic resin, e.g. polystyrene, is heat-plastified in a plastics extruder and is mixed with a normally gaseous agent such as methyl chloride, dichlorodifluoromethane, or the like, under superatmospheric pressure to form a gel which is brought to a temperature between about 60° and 130° C. at which it remains flowable under the conditions employed, then is extruded into the atmosphere wherein the extruded material expands to form a cellular article.

The polybromocyclohexanes are advantageously employed as self-extinguishing agents in the making of cellular articles from normally flammable alkylene aromatic resins. For such purpose the polybromocyclohexane can be dry-blended with the granular alkenyl aromatic resin fed to the plastics extruder or it can be mixed with the volatile normally gaseous agent and the mixture blended with the heat-plastified alkenyl aromatic resin under superatmospheric pressure to form a homogeneous gel which is then foamed by release of the pressure, e.g. by extrusion into the atmosphere.

In an alternative procedure the polybromocyclohexane compound and the alkenyl aromatic resin can be dissolved in a common solvent, after which the solvent is evaporated to obtain an intimate mixture of the resin and said agent. The compositions can also be prepared by mechanically working the heat-softened alkenyl aromatic resin on compounding rolls, a Banbury mixer or a plastics extruder in admixture with the polybromocyclohexane in the desired proportions to obtain a uniform composition which is usually ground, cut or broken to a granular form suitable for molding. The polybromocyclohexane can be used in amounts of from 0.5 to 4.5 percent based on the weight of the alkenyl aromatic resin. Greater amounts of the polybromocyclohexane can be used, but are not required.

It may be mentioned that the proportion of the polybromocyclohexane required to provide self-extinguishing properties for the alkenyl aromatic resin is dependent in part upon the manner in which the ingredients are incorporated with one another. When the alkenyl aromatic resin is heat-softened and mechanically worked on compounding rolls at elevated temperatures, e.g. at from 160° to 240° C. or thereabout only small proportions of the polybromocyclohexane compound are required to render the resin self-extinguishing. By such procedure self-extinguishing polystyrene compositions containing as low as 0.5 percent by weight of pentabromomonochlorocyclohexane have been prepared.

The polybromocyclohexanes employed herein possess good stability to heat at elevated temperatures, e.g. at temperatures between about 160° to 240° C., usually employed in the production of solid and cellular plastic articles from thermoplastic alkenyl aromatic resins by injection molding operations or extrusion methods, and provide flame-retardant and self-extinguishing properties with good color of the molded articles, i.e. there is little, or no discoloring or yellowing of the polymer because of deterioration of the polybromocyclohexane at the elevated temperatures.

The following examples illustrate ways in which the principle of the invention has been applied, but are not to be construed as limiting its scope.

EXAMPLE 1

A charge of 80 grams of a batch of molding grade polystyrene containing one percent by weight of white mineral oil as lubricant was milled on compounding rolls, together with 0.4 gram of pentabromomonochlorocyclohexane, at a temperature of 170° C. for a period of 10 minutes, then was removed from the rolls and was allowed to cool to room temperature.

Portions of the composition were compression molded ae temperatures between 160° and 165° C. to form a plate ⅛ inch thick. Thereafter, the molded plate was heated at a temperature of 200° C. for a period of 10 minutes. Test pieces having the dimensions of ⅛ x ½ inch cross section by 5 inches long were cut from the molded plate. These test pieces were used to determine the flammability or self-extinguishing properties of the product employing procedure similar to that described in ASTM D635-44T. After igniting a test piece of the composition the flame was self-extinguished in 18.5 seconds.

For purpose of comparison, a composition was prepared for another 80 gram portion of the batch of the molding grade polystyrene and 0.4 gram of 1,2-dibromo-1,1,2,2-tetrachloroethane by procedure and subsequent treatment as described above. This composition burned completely when tested for flammability.

EXAMPLE 2

A charge of 80 grams of molding grade polystyrene containing one percent by weight of white mineral oil as lubricant was milled on compounding rolls, together with 0.4 gram of tribromotrichlorocyclohexane, at a temperature of 170° C. for a period of 10 minutes, then was removed from the rolls, allowed to cool to room temperature. The composition was compression molded, heat-treated and tested for flammability employing procedures similar to those employed in Example 1. The composition was self-extinguishing in 45 seconds.

The tribromotrichlorocyclohexane employed in the experiment was prepared by reacting chlorine and bromine with benzene in amounts corresponding to three gram chemical equivalent proportions of bromine and three gram chemical equivalent proportions of chlorine per one gram molecular proportion of benzene in an inert solvent under the influence of ultraviolet light employing procedure similar to that described in Bull. Soc. Chim. (France), pages 118–121 (1949). The reaction was carried out in methylene chloride as the reaction liquid at temperatures between 20° and 25° C. by simultaneously adding the chlorine and bromine to the solution of benzene with stirring while exposing the reaction mixture to rays from an AH–1 mercury vapor 400 watt lamp (General Electric Company) placed adjacent to one side of the reaction vessel. Upon completing the reaction the solvent was evaporated on a steam bath, leaving a residue of a white crystalline material. The product was tribromotrichlorocyclohexane. It melted at temperatures between 137° and 160° C. It was analyzed and found to contain:

|  | Found, percent | Theory, percent |
| --- | --- | --- |
| Bromine | 55.93 | 56.53 |
| Chlorine | 26.45 | 25.08 |

EXAMPLE 3

A charge of 98 grams of polystyrene and 2 grams of hexabromocyclohexane was milled on compounding rolls at a temperature of 160° C. for a period of ten minutes, then was removed, allowed to cool to room temperature. Portions of the product were compression molded to form a flat plate ⅛ inch thick by heating in a mold under pressure at a temperature of 225° C. for a period of 15 minutes. Test pieces having the dimensions of ⅛ x ½ inch cross section by 5 inches long were cut from the molded product. The product would not burn.

EXAMPLE 4

A granular molding grade polystyrene was fed to a plastics extruder at a rate of 30 pounds per hour, together with 0.8 percent by weight of finely divided calcium silicate and 0.2 percent of zinc stearate, and 0.9 pound of pentabromomonochlorocyclohexane per hour. The mixture of materials was heated at a temperature of 160° C. in the extruder and was mixed with methyl chloride fed under pressure into the extruder at a rate of 3 pounds per hour. The resulting mixture was blended into a homogeneous mass and cooled under pressure in a mixing and cooling section of the extruder to a temperature of 100° C., then was extruded as a gel into the atmosphere wherein it foamed to a cellular body having a bulk density of about 2 pounds per cubic foot of the foam. Test pieces were cut from the cellular product having the dimensions of ¼ x 1 inch cross-section by 5 inches long. These test pieces were used to determine the self-extinguishing characteristic for the cellular product. The flame in all test pieces was self-extinguished in from 3–4 seconds.

EXAMPLE 5

In each of a series of experiments, a granular molding grade polystyrene was fed to a plastics extruder at a rate of 30 pounds per hour, together with 0.8 percent by weight of finely divided calcium silicate and 0.2 percent of zinc stearate, and pentabromomonochlorocyclohexane in amount as stated in the following table per hour. The mixture of materials was heated in the extruder at a temperature as stated in the table and was mixed with methyl chloride, fed under pressure into the extruder at a rate of 3 pounds per hour. The resulting mixture was blended into a homogeneous mass and cooled under pressure in a mixing and cooling section of the extruder to a temperature of 100° C., then was extruded as a gel through an outlet into the atmosphere wherein the extruded material foamed to a cellular body having a bulk density of about 2 pounds per cubic foot. Test pieces having the dimensions 1 x 1 inch cross section by 6 inches long were cut from the foamed product. These test pieces were used to determine the flammability of the foamed product.

The table identifies the experiments and gives the proportion of the pentabromomonochlorocyclohexane in the foamed product. The table also gives the temperature to which the polymer was heated in admixture with the pentabromomonochlorocyclohexane in the extruder and a flammability or self-extinguishing property for the foamed product.

Table

| Run No. | Pentabromo-monochloro-cyclohexane, percent | Extruder Temp., °C. | Time to be self-extinguished, sec. |
| --- | --- | --- | --- |
| 1 | 3 | 190 | 1 |
| 2 | 2.5 | 190 | 1 |
| 3 | 1.6 | 190 | 8 |
| 4 | 1.6 | 215 | 10 |
| 5 | 0.4 | 215 | Burns |

We claim:

1. A solid non-flammable thermoplastic polymer comprising in chemically combined form at least 50 percent by weight of at least one alkenyl aromatic compound having the general formula:

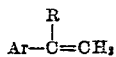

wherein Ar represents an aromatic radical of the group consisting of hydrocarbon and halohydrocarbon radicals of the benzene series and R represents a member of the group consisting of hydrogen and the methyl radical, together with from 0.5 to 4.5 percent by weight of a polybromocyclohexane selected from the group consisting of tribromotrichlorocyclohexane, tetrabromodichlorocyclohexane, pentabromomonochlorocyclohexane, hexabromocyclohexane, and mixtures thereof.

2. A solid non-flammable thermoplastic polymer composition consisting of polystyrene and from 0.5 to 4.5 percent by weight of a polybromocyclohexane selected from the group consisting of tribromotrichlorocyclohexane, tetrabromodichlorocyclohexane, pentabromomonochlorocyclohexane, hexabromocyclohexane, and mixtures thereof.

3. A solid non-flammable, cellular, resinous body composed for the most part of a multiplicity of individually closed cells having thin walls of polystyrene containing from 0.5 to 4.5 percent by weight of a polybromocyclohexane selected from the group consisting of tribromotrichlorocyclohexane, tetrabromodichlorocyclohexane, pentobromomonochlorocyclohexane, hexabromocyclohexane, and mixtures thereof.

4. A solid non-flammable thermoplastic polymer composition consisting of polystyrene and from 0.5 to 4.5 percent by weight of pentabromomonochlorocyclohexane.

5. A solid non-flammable, cellular, resinous body composed for the most part of a multiplicity of individually closed cells having thin walls of polystyrene containing from 0.5 to 4.5 percent by weight of pentabromomonochlorocyclohexane.

6. A solid non-flammable thermoplastic polymer composition consisting of polystyrene and from 0.5 to 4.5 percent by weight of tribromotrichlorocyclohexane.

7. A solid non-flammable thermoplastic polymer composition consisting of polystyrene and from 0.5 to 4.5 percent by weight of hexabromocyclohexane.

References Cited in the file of this patent

UNITED STATES PATENTS

| | | |
| --- | --- | --- |
| 2,658,877 | Dreisbach et al. | Nov. 10, 1953 |
| 2,676,927 | McCurdy et al. | Apr. 27, 1954 |
| 2,723,963 | Price et al. | Nov. 15, 1955 |
| 2,760,947 | Werkema et al. | Aug. 28, 1956 |

OTHER REFERENCES

Bull. Soc. Chem. France, 1955, pages 46–60; referred to in 50 C.A. 2448.

Z. Naturforsch 8b, 617–18 (1953); referred to in 49 C.A. 2338.